United States Patent Office 3,298,299
Patented Jan. 17, 1967

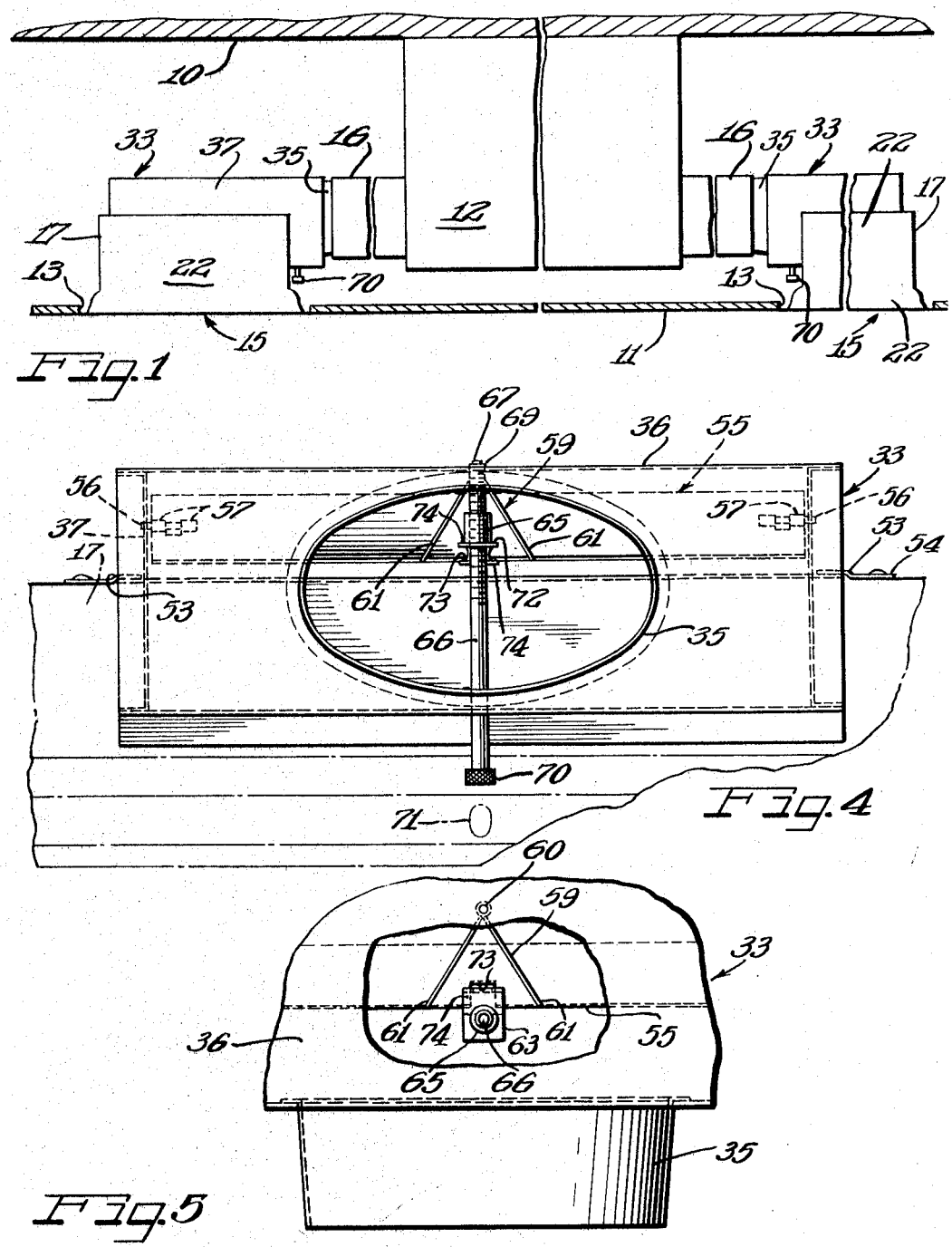

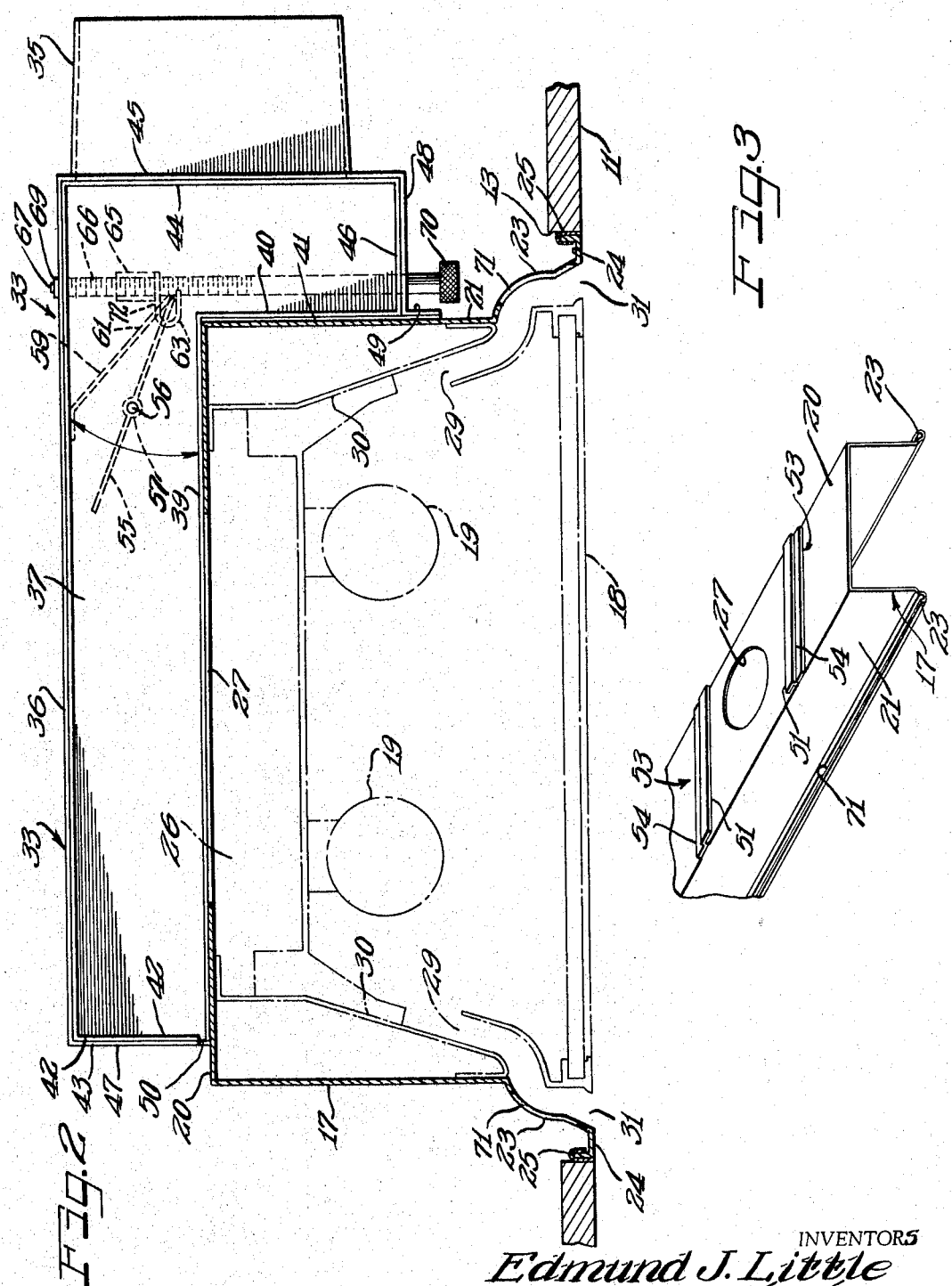

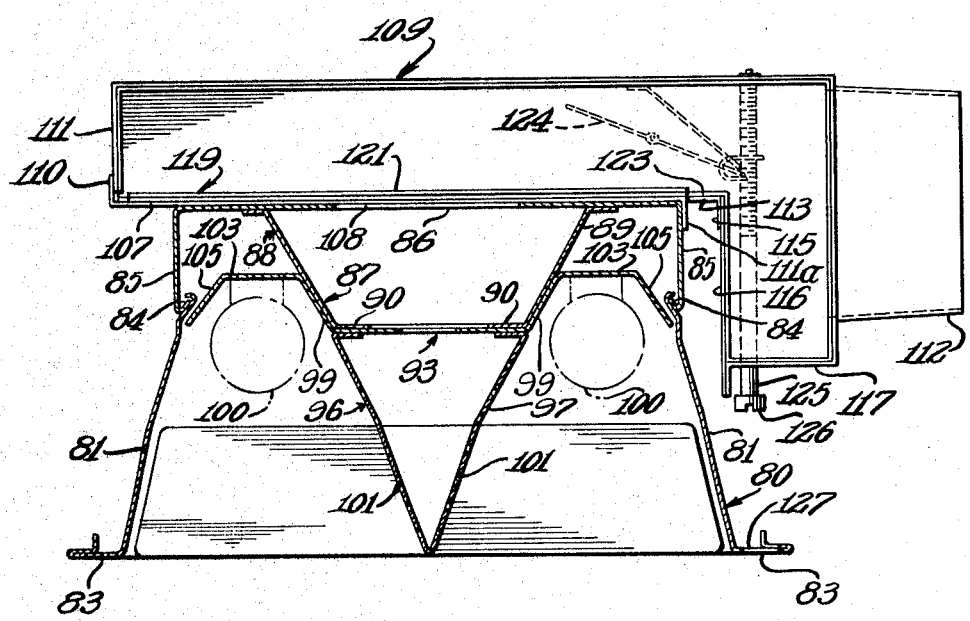
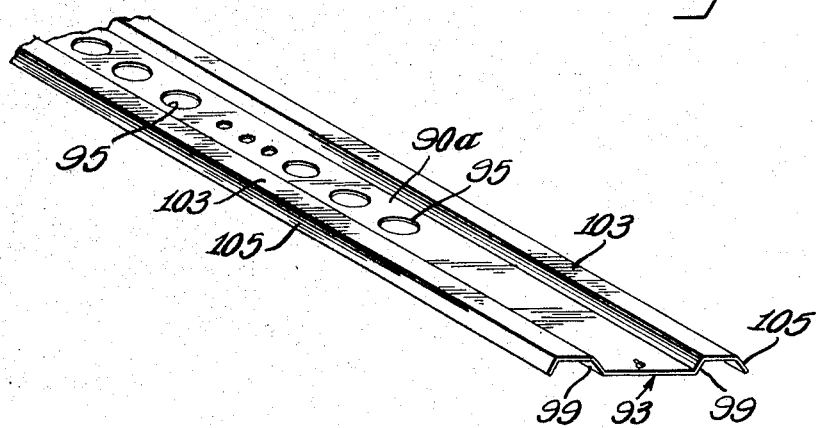

3,298,299
SIDE ENTRY VALVE FOR AIR HANDLING
TROFFERS
Edmund J. Little, Lombard, Ill., and George K. Raider,
Schiller Park, Ill., assignors to The Pyle-National Company, Chicago, Ill., a corporation of New Jersey
Filed July 13, 1964, Ser. No. 382,015
9 Claims. (Cl. 98—40)

This invention relates to ventilating systems and more particularly relates to the air valve and inlet structure for an air fixture for use in a ceiling construction of the type wherein ventilating air is distributed and illumination is emitted from the ceiling of the room.

It is common practice in the lighting and air conditioning of rooms, to provide a false ceiling forming a mounting for a lighting and ventilating housing, commonly called a troffer housing and containing fluorescent tubes recessed upwardly within the ceiling, and air ventilating passageways for introducing conditioned air into the room from the ceiling.

In such installations, primary air ducts are mounted between the false ceiling and the main ceiling of the room and the troffer housings extend along each side of the air ducts and are supplied with air from the ducts through flexible coupling means and through the tops of the housings into a plenum chamber extending therealong. The air inlets are usually provided with valves controlling the flow of air thereinto, commonly being butterfly valves, which are manually adjusted. Where the valve is located on top of the housing, which is usually the case if the air is to enter the housing from the top thereof, it is difficult to adjust the butterfly valve, particularly where the housings are furnished with glass or louvers covering the lower faces of the housings without removing the glass or louvers. When the glass or louvers are removed, the distribution of air cannot be balanced with the fluorescent lighting tubes in their normal operative positions, with the result that upon adjustment of the valve and replacement of the glass or louvers, the air flow is frequently out of balance with the lights.

Also where over-all height is a problem, it is difficult to connect the primary air duct with the housings to admit air into the housings through the tops thereof and where it is necessary to introduce air to the housing from the side of the housing, due to space limitations, the housings or fittings must be either right or left hand housings and fittings with a resultant disadvantage in locating the housings along the air ducts and the connecting of the housings with the ducts.

A principal object of the present invention is to remedy the foregoing difficulties by providing a fitting for troffer light housings accommodating the entry of air through the side of the fitting, which fitting may readily be adapted for connection to air ducts extending either to the right or the left of the housing.

A further object of the invention is to provide a side entry fitting for lighting and ventilating housings for ceiling installation in which the fitting has communication with an upwardly opening air inlet in the housing, and is supplied with air from the side of the housing and has an air flow control valve incorporated as a part thereof and accessible for adjustment without removing the louvers or glass of the lighting and ventilating housings.

Another object of the invention is to provide a side entry fitting for supplying air to the upwardly opening air inlets of lighting and ventilating housings in which the fitting may be mounted to extend either to the right or the left of the housing with no change in construction of the fitting or housing.

A still further object of the invention is to provide a side entry fitting for lighting and ventilating housings having communication with the upwardly opening air inlet and the housing by simply sliding the fitting along the top of the housing and having an adjustable butterfly type of valve controlling the flow of air from the primary air duct to the inlet and adjustable from beneath the housing through an access opening in the housing.

These and other objects of the invention will appear from time to time as the following specification proceeds and with reference to the accompanying drawings wherein:

FIGURE 1 is a generally diagrammatic sectional view showing a false ceiling of a room structure and the connections from the primary air duct extending between the main ceiling and the false ceiling and illustrating the supply of air to the ventilating and lighting housings from the sides thereof;

FIGURE 2 is a fragmentary sectional view taken transversely of a ventilating and lighting housing with certain parts in phantom and showing a side entry air fitting constructed in accordance with the principles of the present invention mounted on the housing;

FIGURE 3 is a fragmentary perspective view of a lighting and ventilating housing showing the inlet into the plenum chamber of the housing and the retaining means for retaining the side entry fitting to the inlet;

FIGURE 4 is an end view of the side entry fitting showing the fitting mounted on a lighting and ventilating housing;

FIGURE 5 is a fragmentary top plan view of the side entry fitting;

FIGURE 6 is a fragmentary transverse sectional view taken through a modified form of ventilating and lighting housing and showing a side entry air fitting constructed in accordance with the present invention applied thereto; and FIGURE 7 is a perspective view of the air plate of the ventilating and lighting housing of FIGURE 5.

In the embodiment of the invention illustrated in the drawings, we have shown in FIGURE 1 a main ceiling 10 of a room of a building and a sub or false ceiling 11 spaced below the main ceiling 10 and cooperating therewith to provide a space for at least one primary air duct 12 of an air conditioning system. The false ceiling 11 may have a plurality of openings 13 therein, extending parallel to the primary air duct 12, and on opposite sides of said air duct and forming openings for receiving and supporting a combination lighting-ventilating unit incorporating the principles of the present invention and genrally indicated by reference character 15. Ventilating air from the primary air duct 12 may be conducted to each respective unit 15 by means of individual flexible conduits 16 leading from the sides of said air duct and suitably sealed thereto.

Each ventilating-lighting unit is shown as being in the form of a troffer light housing 17 of the glass bottom variety wherein rays of light are diffused through a diffusion member in the form of a glass 18 extending across the bottom of the troffer light housing as a continuation of the ceiling surface provided by the false ceiling 11. The troffer light housing may contain the usual parallel elongated gas glow tubes 19, 19 suitably supported therein, and commonly known as fluorescent tubes.

Each housing 17 is generally of the inverted trough-like form including a flat top wall 20, side walls 21 connected together by end walls 22. The side walls 21 have outwardly flaring lower end portions 23 extending outwardly of said side walls and terminating at their lower ends in flanges 24 having ribs 25 extending upwardly therefrom and defining the outer edges thereof. The trough 17 contains the usual plenum chamber 26 extending beneath said top thereof and for the length thereof and besides forming an air distributing and diffusing unit also forms a mounting for the gas glow tubes, 19, 19. An inlet 27 opens through the top 20 of the trough 17 to supply inlet air to the plenum chamber 26. Air deflectors 29, 29 are spaced inwardly of outwardly flaring interior walls 30, 30 extending downwardly along the gas glow tubes 19, 19 in outwardly spaced relation with respect thereto. The walls 30, 30 form upward continuations of the outwardly flaring portion 23 of the side walls 21. The air deflectors 29, 29 with the walls 30, 30 and 23, 23 form air diffusion passageways for supplying air from the plenum chamber to pass along opposite sides of the glass 18 through slots 31, 31, to be distributed in the room.

Referring now in particular to the side entry air supply means of the present invention for supplying air to the inlet 27 from a selected side of the trough 17, a side entry air fitting 33 is shown as forming a means to which the flexible tube 16 may be attached. The inlet fitting 33 as shown in FIGURE 2 is of a generally L-shaped form in side elevation having a top 36 parallel to the top wall 20 of the housing 17 and spaced a substantial distance above said top wall. The fitting also has generally parallel L-shaped side walls 37 having flanges 39 extending outwardly of their lower margins along the top of the trough 17. The side walls 37 also have flanges 40 extending from their inner vertical margins and extending downwardly from the flanges 39 along an inner end wall 41 for the fitting. The end wall 41 abuts a side wall 21 of the housing 17. The side walls 37 are also flanged about the margins of said side walls, end flanges 42 of which abut end walls 43 of the fitting, shown in FIGURE 2 as being a continuation of the top wall 36. Opposite end flanges 44 abut an opposite end wall 45, which end wall forms a mounting for the oval inlet collar 35. The end wall 45 is shown in FIG. 2 as being turned inwardly along the bottoms of the lower flanges 46 of the side walls 37 to the plate 41, to form a bottom wall 48. The bottom wall 48 in turn terminates into a depending flange 49 extending downwardly along the plate 41.

The fitting 33 is thus entirely enclosed except for the bottom thereof which is open to afford free communication with the inlet 27 in the top wall 20 of the housing 17.

The end wall 43 and flange 42 are cut away at their lower end portions to form notches 50 at opposite ends thereof to receive parallel horizontal legs 51 of Z angles 53. The Z angles 53 extend across the top 20 on opposite sides of the inlet 27 and are welded or otherwise secured to the top wall 20 on horizontal legs 54 of said Z angles. This spaces the legs 51 to extend parallel to the top 20 in vertically spaced relation with respect thereto, a distance sufficient to engage to top surfaces of the flanges 39 and accommodate the fitting to be slidably moved across the top of the housing 17 over the inlet 27, and supply ventilating air thereto.

A valve 55 is provided to control the flow of air into the fitting 33 and air inlet 27. The valve 55 is herein shown as being a butterfly type of valve extending for the width of the fitting and cooperating with the underside of the top 36 and the top 20 of the housing 17, to govern the flow of air into and through the inlet 27. The valve 55 is in the form of a plate pivoted intermediate its ends to the side walls 37 of the fitting 33, on pivot pins 56, extending through spaced central boss portions 57 of said valve and pivotally mounted in the side walls 37 at their outer ends. The valve 55 is biased toward a closed position by a leaf or wire spring 59, riveted intermediate its ends to the top 20 as by a rivet 60 and having downwardly inclined diverging legs 61 having slidable engagement with the top surface of the butterfly valve 55 adjacent the opposite edge portion from the inlet 27. The legs 61 extend along opposite sides of a valve operator 63 engaging the edge of the valve and pivoting the valve about the axis of the coaxial pins 56. The operator 63 is shown in FIGURES 2, 4 and 5 as having an internally threaded collar 65 threaded on a vertical threaded shaft 66 having a reduced upper end portion 67 passing through the top wall 20 of the housing 17 and locked thereto as by a retaining washer 69, which may be a snap type of washer. The threaded shaft 66 also extends through the lower wall 48 of the fitting and has a head 70 at its lower end, recessed or slotted to receive a screwdriver and the like to accommodate the turning of said shaft and the adjustment of the valve 55. An access opening 71 is provided in the flared wall portion 23 of the housing 17 to accommodate adjustment of the valve 55 from the room through said access opening, without removing the diffuser 19 or any other parts of the apparatus.

The operative connection from the operator 23 to the butterfly valve 55 includes a generally U-shaped operator 72 extending within a slot 73 formed in the butterfly valve 55 and opening to the edge thereof and having stop legs 74, 74 extending above and below the valve. The base of the operator, connecting the legs 74 together, is recessed inwardly of the margins of said legs, as shown in FIGURE 4 to accommodate the spring 59 to bias the valve into engagement with the lower leg of the operator. Turning of the threaded rod or shaft 66 will thus move the valve 55 about the axis of the coaxial pivot pins 56 in one direction or another depending upon the direction of turning movement of rod.

In the form of the invention illustrated in FIGURES 6 and 7, we have shown a troffer light or air and ventilating housing 80 having opposite side walls 81 extending upwardly and angularly inwardly from laterally outwardly extending flanges 83. The side walls 81 extend partially about hooked lower end portions 84 of parallel depending flanges 85, depending from opposite sides of a cover plate 86. The cover plate 86 extends for the length of the housing 80 and forms a top wall of a plenum chamber 87 formed by an upwardly opening trough-like structure 88 having opposite inclined side walls 89 extending for the length thereof and marginal flanges 90 extending inwardly from the bottom thereof and forming an opening, opening to a reflector plate 93.

The reflector plate 93 has a plain central portion 90a extending along the bottom of the plenum 88 and the flanges 90 of the trough like structure 88. The plain central portion 90a has a plurality of holes 95 therein, suitably spaced along the longitudinal center thereof. The holes 90 are of different sizes, the central holes being smaller than the outwardly spaced holes to provide the proper air distribution to the inside of a parabolic reflector 96. The parabolic reflector 96 has opposite converging side walls 97 forming downward continuations of upwardly extending side walls 99, 99, extending upwardly along opposite sides 89 of the plenum 87. The side walls 99, 99 with the side walls 97, 97 form a substantially parabolic reflector for fluorescent tubes 100, 100 extending along the side walls 99. The side walls 97, 97 of the parabolic reflector 96 have a plurality of holes 101, 101 leading therethrough and forming perforations for the distribution of air to the ceiling of a room.

The side walls 99, 99 of the reflector 93 terminate at their upper end portions into laterally extending generally horizontal walls 103, 103. The horizontal walls 103, 103 terminate at their outer ends into downwardly inclined reflectors 105, 105, cooperating with the undersides of the laterally extending side walls 103 and the parabolic reflectors formed by the side walls 99 and 97, to form light distributors for the gas glow or fluorescent tubes 100, 100, distributing the light downwardly of the ceiling.

An adapter plate 107 is mounted on the top of the cover 86 and has a central open portion (not shown) in registry with a central opening 108 in the cover 86, to accommodate the passage of air therethrough into the plenum 87. The adapter plate 107 forms a mounting plate for a side entry air fitting 109 like the side entry air fitting 33 shown in FIGURE 2. As shown in FIGURE 6, the adapter plate 107 has an upright flange 110 extending upwardly from one end thereof and abutting a rear end wall 111 of the fitting 109, and has spaced depending flanged portions 111a extending downwardly along a depending flange 85 of the cover 86 on the side thereof adjacent an inlet 112 into said fitting. The adapter plate 107 also has a portion 113 extending outwardly of the flanges 111a, 111a, between said flanges, and having a depending flange 115 at its outer end portion abutting a wall 16 of a depending housing portion 117, forming a mounting for the inlet fitting 112.

The side entry inlet fitting 109 may be retained to the adapter plate 107 in the same manner the side entry air fitting 33 is retained to the top of the trough 17, that is, by Z-angles 119, extending across the adapter plate 107 on opposite sides of the side entry air fitting 109 and having legs 121 slidably engaging flanges 123, 123 extending outwardly of opposite sides of the fitting 109.

The side entry fitting 109 contains an elongated butterfly type of valve 124 operated by a threaded rod 125 rotatably mounted in said fitting adjacent the inlet end thereof and having a depending head 126 having a downwardly opening slot therein, affording a means for adjusting the valve by a screwdriver and the like inserted through an opening 127 in the flange 83.

It may be seen from the foregoing that in the form of the invention illustrated in FIGURE 2, side entry fitting 33 may be slid onto the housing 17 from either side thereof, to thereby accommodate the fitting to be used to connect the inlet 27 to the primary air duct when the housing is on one side or the other of the primary air duct, without changing the structure of either the fitting or the housing.

It may also be seen that since the air inlet fitting is a side entry fitting, that said fitting may be above the plane of the primary air duct with the result that there is a considerable reduction in space required to connect the primary air duct to the housing and that the bottom surface of the housing may thus be closer to the bottom surface of the primary air duct and may even be on substantially the same level as the level of the primary air duct without impeding the circulation of air from the primary air duct to the air inlet in the top of the housing.

It may further be seen that the air valve may readily be adjusted to balance the circulation of air into the room and prevent the creation of drafts in the room without altering the light or air circulating structure or removing any parts therefrom when the structure is in position in the ceiling. It will further be noted from FIGURE 2 that access openings 71 are provided in each side of the housing 17 through the flared lower wall portions 23 to accommodate adjustment of the valve when the housing is either to the right or the left of the primary air duct.

While we have herein shown and described one form in which the invention may be embodied, it may readily be understood that various variations and modifications in the invention may be attained without departing from the spirit and scope of the novel concepts thereof.

We claim as our invention:
1. An air handling troffer comprising:
   a troffer housing for a lighting fixture having upper wall means extending for the length of the fixture,
   said upper wall means having a vertical opening formed therein through which a supply of air may be directed,
   and means cooperating with said upper wall means and forming an inverted L-shaped plenum chamber therewith, having
      a long leg overlying said upper wall means and a short leg disposed adjacent said troffer housing,
      said short leg having a side opening therein through which air flows,
   and a valve mechanism comprising a blade extending across the interior of said plenum chamber, thereby to form an adjustable throat between said short leg and said long leg for adjusting the flow of air through the troffer.

2. An air handling troffer as defined in claim 1,
wherein the blade is pivotally mounted in the plenum chamber,
and wherein actuating means are connected to said blade and extend outwardly of said plenum chamber to adjust the position of the blade.

3. The structure of claim 1,
wherein the blade is pivotally connected to the plenum chamber and extends into the space within said short leg,
wherein spring means bias said blade to a closed position,
wherein an actuator rod extends vertically along said short leg and is mounted therein for rotational and translational movement,
wherein a collar is mounted on said actuator rod and moved translationally therewith,
and wherein said collar has an operative engaging connection with an edge of said blade, for adjustably moving said blade upon turning movement of said rod to effect translational movement of said collar.

4. In combination with the ceiling of a room to be ventilated,
   a troffer housing extending upwardly behind the ceiling in concealed relation with respect thereto and having a trough opening downwardly through the ceiling and directing a flow of ventilating air into the room,
   said trough having a relatively flat top surface having an air inlet leading vertically therethrough flush with said flat top surface and having retainer means extending transversely thereof on opposite sides of said inlet,
   and a side entry air fitting slidably engageable with said retainer means and retained to said trough thereby, said air fitting having
      a side air inlet opening through a side thereof and spaced laterally from said trough,
      and said fitting and retainer means being so arranged as to accommodate mounting of said fitting on said trough from either side thereof for connection with a primary air duct extending along one side or the other of said trough.

5. The structure of claim 4,
wherein air valve means are provided for regulating the supply of air through said fitting and into said inlet in the top of said trough and comprise an air valve in said fitting cooperating with said top surface of said trough and a facing under surface of said fitting and adjustable from beneath the ceiling outside of said housing.

6. The structure of claim 4,
wherein a butterfly valve extends across said fitting downstream of said side air inlet and cooperates with the top surface of said trough and the facing under surface of said fitting, to control the flow of air through said inlet,
wherein spring means bias said valve toward a closed position,
wherein a vertically extending rotational and translationally movable rod is mounted in said fitting to one side of said trough and has a collar thereon moved translationally thereby,
wherein an engaging connection is provided between said collar and an edge of said valve, for adjustably moving said valve upon turning movement of said rod to effect translational movement thereof,
and wherein said rod has a lower end portion accessible from beneath the ceiling.

7. The structure of claim 4,
wherein the fitting has parallel spaced side walls having flanges extending outwardly from the bottoms of said side walls and cooperating with said retainer means, wherein the fitting also has opposite end walls and a top wall connecting said end walls and side walls together to form an open bottom fitting, wherein one end wall is spaced inwardly of one side of said trough and the other end wall is spaced laterally outwardly of the opposite side of said trough when said fitting is in position on said trough, wherein said side air inlet opens through said end wall spaced laterally from the side of said trough and is positionable to either side of said trough by slidably moving said flanges along said retainer means into position over said inlet, wherein a butterfly valve is pivoted to the side walls of said fitting in the space between the flat top surface of said trough and the under surface of said top wall of said fitting to control the flow of air into said housing through said inlet, and wherein a threaded rod has operative connection with an edge of said valve for varying the flow of air into said inlet opening through the top of said trough.

8. The structure of claim 4, wherein the troffer housing is an elongated troffer-light housing having a top wall and side and end walls extending downwardly therefrom, wherein a reflector extends along said housing beneath said top wall, wherein inwardly spaced angularly outwardly and downwardly directed side walls extend from said top wall downwardly to the bottoms of said side walls along opposite sides of said reflector, wherein the space between said top wall of said troffer-light housing and said reflector forms a plenum chamber, wherein the inlet leading through the top wall of said troffer-light housing leads into said plenum chamber, and wherein said reflector is perforated for at least a portion of the area thereof to provide air passageways supplying air from said plenum for diffusion through said reflector.

9. The structure of claim 8, wherein the perforations in said reflector provide air distribution passageways, and wherein the air distribution passageways are relatively small cross-sectional area passageways adjacent the transverse center of said reflector and are of a larger cross-sectional area on opposite sides of said small cross-sectional area passageways.

References Cited by the Examiner
UNITED STATES PATENTS

| | | | |
|---|---|---|---|
| 2,985,090 | 5/1961 | Quin | 98—40 |
| 3,090,434 | 5/1963 | Benson et al. | 98—40 |
| 3,119,320 | 1/1964 | Batchelor | 98—40 |
| 3,169,467 | 2/1965 | Archer | 98—40 |
| 3,181,450 | 5/1965 | Kruger | 98—40 |
| 3,220,332 | 11/1965 | Straub | 98—40 |

MEYER PERLIN, *Primary Examiner.*

ROBERT A. O'LEARY, *Examiner.*

W. E. WAYNER, *Assistant Examiner.*